(12) United States Patent
Baek et al.

(10) Patent No.: US 12,082,176 B2
(45) Date of Patent: Sep. 3, 2024

(54) METHOD AND DEVICE FOR PRIORITIZATION OF LOGIC CHANNEL INCLUDING MAC CE HAVING PRIORITY VALUE

(71) Applicant: Samsung Electronics Co., Ltd., Suwon-si (KR)

(72) Inventors: Sangkyu Baek, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 17/642,844

(22) PCT Filed: Sep. 28, 2020

(86) PCT No.: PCT/KR2020/013228
§ 371 (c)(1),
(2) Date: Mar. 14, 2022

(87) PCT Pub. No.: WO2021/066460
PCT Pub. Date: Apr. 8, 2021

(65) Prior Publication Data
US 2022/0377738 A1    Nov. 24, 2022

(30) Foreign Application Priority Data

Oct. 2, 2019 (KR) .......................... 10-2019-0122373

(51) Int. Cl.
*H04W 72/0453* (2023.01)
*H04W 72/56* (2023.01)
*H04W 80/02* (2009.01)

(52) U.S. Cl.
CPC ....... *H04W 72/0453* (2013.01); *H04W 72/56* (2023.01); *H04W 80/02* (2013.01)

(58) Field of Classification Search
CPC . H04W 72/0453; H04W 72/56; H04W 80/02; H04W 72/1242; H04W 52/365;
(Continued)

(56) References Cited

U.S. PATENT DOCUMENTS 10,397,833 B2    8/2019 Lee et al.
10,660,118 B2    5/2020 Wang et al.
(Continued)

FOREIGN PATENT DOCUMENTS

EP     3 331 277 A1    6/2018
EP     3 668 172 A1    6/2020
(Continued)

OTHER PUBLICATIONS

WO 2018174477 A1 (Year: 2018).*
(Continued)

*Primary Examiner* — Rushil P. Sampat
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the present disclosure, a priority relative to data is configured by assigning a priority a MAC CE so that a MAC PDU may be transmitted according to the priority.

14 Claims, 10 Drawing Sheets

(58) Field of Classification Search
CPC ........... H04W 28/0278; H04W 72/569; H04W 76/023; H04W 76/14; H04W 72/1284; H04W 72/21; H04W 92/18
See application file for complete search history.

(56) References Cited

U.S. PATENT DOCUMENTS

| | | | |
|---|---|---|---|
| 2010/0272046 A1 | 10/2010 | Guo | |
| 2017/0374674 A1* | 12/2017 | Lee | H04W 76/14 |
| 2020/0037315 A1* | 1/2020 | Lee | H04W 72/23 |
| 2020/0245188 A1* | 7/2020 | Zhang | H04W 72/569 |

FOREIGN PATENT DOCUMENTS

| | | |
|---|---|---|
| KR | 10-2017-0057227 A | 5/2017 |
| KR | 10-2021-0036192 A | 4/2021 |
| WO | 2018/141952 A1 | 8/2018 |
| WO | 2019/029432 A1 | 2/2019 |

OTHER PUBLICATIONS

WO 2019029432 A1 (Year: 2019).*
Samsung, "Discussion on Prioritization between MAC CE and LCH", R2-1711598, Oct. 8, 2017.
Extended European Search Report dated Jul. 25, 2022, issued in European Application No. EP 20 87 1271.
Asia Pacific Telecom Co. Ltd, 'Prioritization between URLLC data and MAC CE, in MAC PDU', R2-1909183, 3GPP TSG-RAN WG2 Meeting #107, Prague, Czech, Aug. 16, 2019.
LG Electronics Inc., 'Prioritization between MAC CE and urgent data', R2-1911206, 3GPP TSG-RAN WG2 Meeting #107, Prague, Czech, Aug. 16, 2019.
3GPP TS 38.321 V15.1.0 (Mar. 2018) 3rd Generation Partnership Project; Technical Specification Group Radio Access Network; NR; Medium Access Control (MAC) protocol specification, Apr. 2, 2018.

* cited by examiner

- MacCePriorityList = List of MacCePriority
- MacCePriority = sequence {MacCeType, Priority}

FIG. 7

- MacCePriorityList = List of MacCePriority
- MacCePriority = sequence {MacCeType, logicalChannelConfig}

FIG. 8

- MacCeConfigList = List of MacCeConfig
- MacCeConfig = sequence {MacCeType, Priority, PBR,···

810

METHOD AND DEVICE FOR PRIORITIZATION OF LOGIC CHANNEL INCLUDING MAC CE HAVING PRIORITY VALUE

TECHNICAL FIELD

The disclosure relates to operations of a terminal and a base station in a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, in a next-generation mobile communication system, the need to further specify the content in which a medium access control (MAC) control element (CE) has a higher priority than data of a logical channel has emerged.

DISCLOSURE OF INVENTION

Technical Problem

In a next-generation mobile communication system, there is a need for a method of specifying the priority of a MAC CE.

Solution to Problem

A control method of a terminal according to an embodiment of the disclosure may include identifying whether, among at least one medium access control (MAC) control element (CE), a MAC CE having a higher priority than data exists, determining, in case of identifying that a MAC CE having a higher priority than data exists, to include the MAC CE having a higher priority than data in a MAC protocol data unit (PDU), and generating the MAC PDU based on the determination.

On the other hand, a terminal according to another embodiment of the disclosure may include a transceiver, and a controller that is configured to identify whether, among at least one medium access control (MAC) control element (CE), a MAC CE having a higher priority than data exists, determine, in case of identifying that a MAC CE having a higher priority than data exists, to include the MAC CE having a higher priority than data in a MAC protocol data unit (PDU), and control generation of the MAC PDU based on the determination.

Advantageous Effects of Invention

According to the disclosure, priorities are assigned to MAC CEs and a relative priority with data is configured, so that MAC PDUs can be transmitted according to the priority.

BRIEF DESCRIPTION OF DRAWINGS

FIG. 6 illustrates a method of configuring a priority value for a MAC CE.

FIG. 7 illustrates a method of configuring a priority value for a MAC CE.

FIG. 8 illustrates a method of configuring a priority value for a MAC CE.

MODE FOR THE INVENTION

Figure 1:
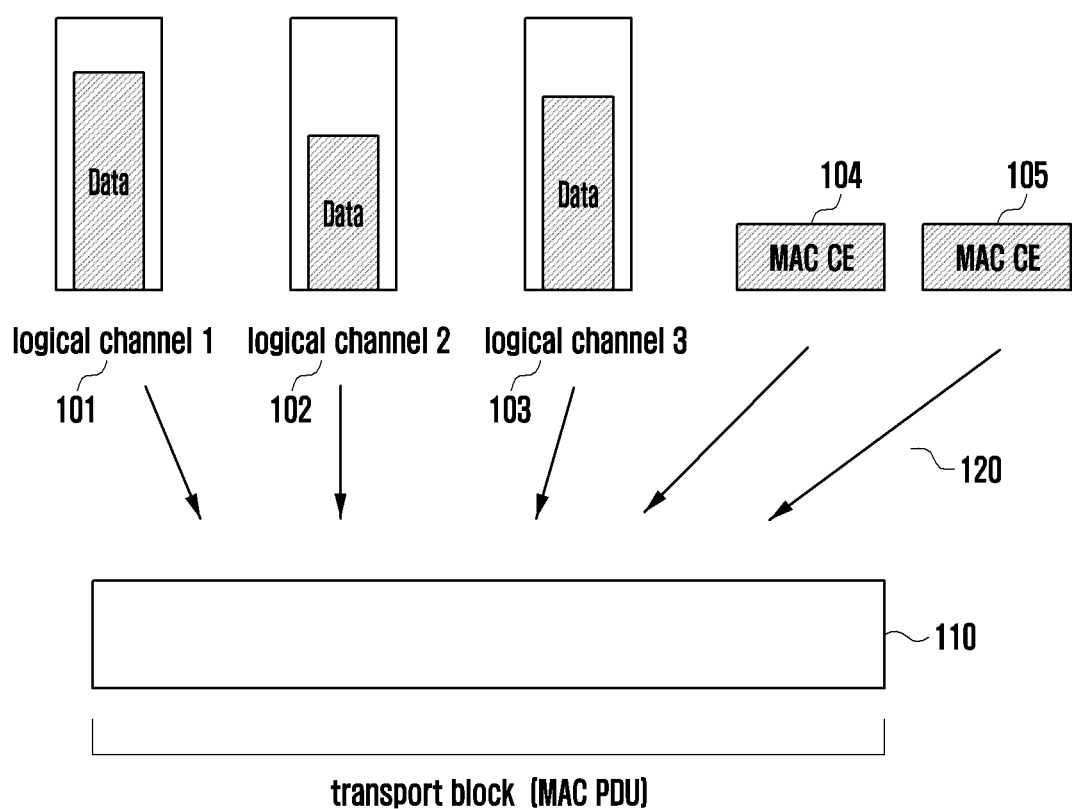
FIG. 1 illustrates an operation process in which the terminal assigns MAC CEs and data to a MAC PDU.

In the following description of embodiments of the present specification, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit," "module," or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card.

In the following description of the disclosure, descriptions of functions and structures well known in the art may be omitted for clarity and conciseness without obscuring the subject matter of the disclosure. Hereinafter, embodiments of the disclosure will be described with reference to the accompanying drawings.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description below, the disclosure uses terms and names defined in the 3GPP LTE (3rd generation partnership project long term evolution) standard, which is the latest standard among communication standards that exist. However, the disclosure is not limited by the above terms and names, and may be equally applied to systems conforming to other standards. In particular, the disclosure can be applied to 3GPP NR (new radio: 5G mobile communication standard). FIG. 1 illustrates an operation process in which the terminal assigns MAC CEs and data to a MAC PDU. In the embodiment of FIG. 1, it is assumed that three logical channels including logical channel 1 (101), logical channel 2 (102) and logical channel 3 (103), and two MAC control elements (CEs) 104 and 105 are present. However, this is an embodiment, and the number of logical channels configured in the terminal at one time point and the number of MAC CEs that the terminal needs to transmit at one time point are not related to the disclosure. When the terminal is allocated a transport block (TB) 110, the terminal may be allocated a certain amount of radio resources according to the priority of each logical channel and MAC CE, and may include logical channel data and MAC CE in the transport block (120). A transport block is a term used in the physical layer, and it is called a MAC protocol data unit (PDU) in the MAC layer. Here, the process of allocating the radio resources of the MAC PDU to a plurality of logical channels is called logical channel prioritization (LCP). The operation process of assigning MAC CEs and data to the MAC PDU is called multiplexing, and the logical channel prioritization process may mean a part of the multiplexing operation.

For the multiplexing and logical channel prioritization process, it is necessary to configure values that determine how much priority each logical channel has, how much transmission speed should be guaranteed for it, and on what resource it can be transmitted. To this end, it is possible to configure values such as priority where the smaller value takes precedence, prioritized bit rate (PBR), and bucket size duration (BSD), through which logical channel prioritization can be performed. In addition, each logical channel may be configured with restrictions such as a list of cells in which actual data can be transmitted and the subcarrier spacing, and can transmit data only through radio resources allocated according to specific conditions due to these restrictions. In one embodiment, there may be an indicator indicating whether the logical channel is a logical channel corresponding to an ultra-reliable and low-latency communication (URLLC) service. In this case, the logical channel configured with a URLLC indicator may utilize a resource corresponding to the URLLC service. For this, the base station may configure a field value such as URLLCDataAllowed. It may be indicated that a resource corresponding to the URLLC service can be used based on a field value such as URLLCDataAllowed. In another embodiment, a logical channel configured with a URLLC indicator may take precedence in utilizing a resource corresponding to the URLLC service over a logical channel not configured with a URLLC indicator. In this case as well, by configuring a field value such as URLLCDataAllowed, it may be indicated that a resource corresponding to the URLLC service can be used preferentially.

Generally in a 4G (4th generation mobile communication) system, it is assumed that only a logical channel has a priority value, the MAC CEs 104 and 105 have only a relative priority according to the type of the MAC CE, and each MAC CE has an absolutely higher priority or absolutely lower priority than data of a logical channel. However, in the case of a service requiring high-speed data transmission, such as a URLLC service, the MAC CE for the URLLC service needs to have a higher priority than some MAC CEs. To this end, MAC CEs may also participate in logical channel prioritization with a priority value. The priority value of a MAC CE may be configured by an RRC setup or reconfiguration message. However, in a certain embodiment, it may be included in a system information block and transmitted by the base station to the terminal. However, when such a configured value of priority is not transmitted, the terminal may apply the priority of a MAC CE using a predefined default value. In another embodiment, the priority of a MAC CE may be configured by the priority of a logical channel that has triggered the MAC CE. For example, in the case of a buffer status report (BSR) MAC CE, the priority value of a logical channel that has triggered the corresponding BSR or the priority value of the logical channel with the highest priority at the time of sending the BSR among the logical channels with remaining data except for the data containing the BSR may be the priority value of the corresponding BSR.

Figure 2:
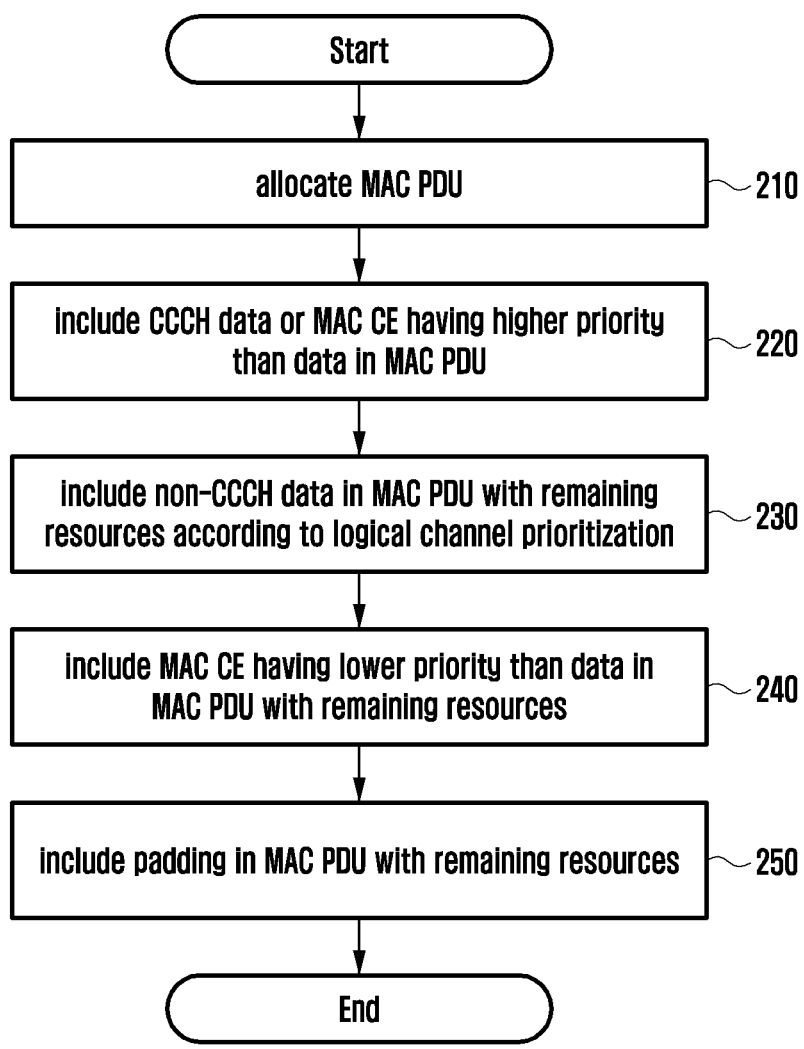
FIG. 2 illustrates a detailed operation process in which the terminal assigns MAC CEs and data to a MAC PDU.

FIG. 2 is a flowchart illustrating a detailed operation process in which the terminal assigns MAC CEs and data to a MAC PDU. The terminal may be allocated a MAC PDU (210). For example, the terminal may be allocated resources by the base station for transmitting a MAC PDU. The terminal may first include CCCH data or a MAC CE having a higher priority than non-CCCH data in the MAC PDU (220). For example, if CCCH data is present, the terminal may determine to include the CCCH data in the MAC PDU first. Or, when a MAC CE having a higher priority than non-CCCH data is present, the terminal may determine to include the MAC CE in the MAC PDU. Here, if the allocated resource of the MAC PDU is not large enough to include CCCH data or a MAC CE, the CCCH data or MAC CE cannot be included. If there is no CCCH data or MAC CE having a higher priority than non-CCCH data, the corresponding CCCH data or MAC CE cannot be included. MAC CEs having a higher priority than non-CCCH data may include C-RNTI MAC CE, configured grant confirmation MAC CE, non-padding buffer status report (BSR), single entry power headroom report (PHR), multiple entry PHR, or the like.

If there are unallocated resources remaining after step 220, the terminal may include non-CCCH data in the MAC PDU with remaining resources according to logical channel prioritization (230). Related parameters for logical channel prioritization may be received from the base station through an RRC message when a corresponding logical channel is established. The corresponding parameters may include parameters for prioritized bit rate (PBR), bucket size duration (BSD), and priority. By using the above parameters, the terminal may update the Bj value (data to be processed for logical channel j) for each logical channel. The Bj value is used at the first step of logical channel prioritization, and the terminal may allocate resources to logical channels with Bj greater than 0 in order of priority at the first step of logical channel prioritization. Then, the Bj value is decreased by the amount of the allocated resources. If there are still remaining resources after the first step, at the second step of logical channel prioritization, resources may be allocated so that all residual data of a logical channel can be transmitted in the order of priority of the logical channels regardless of Bj.

If there are remaining resources that are not allocated after step 230, the terminal may include a MAC CE having a lower priority than data in the MAC PDU with remaining resources (240). Here, if the allocated resource of the MAC PDU is not large enough to include the corresponding MAC CE, the corresponding MAC CE (MAC CE having a lower priority than data) cannot be included. And, if the corresponding MAC CE does not exist, the corresponding MAC CE cannot be included. MAC CEs having a lower priority than data may include recommended bit rate (RBR) query MAC CE, padding BSR MAC CE, or the like. When there are unallocated resources remaining after step 240, a padding may be included in the MAC PDU with remaining resources (250).

Figure 3:
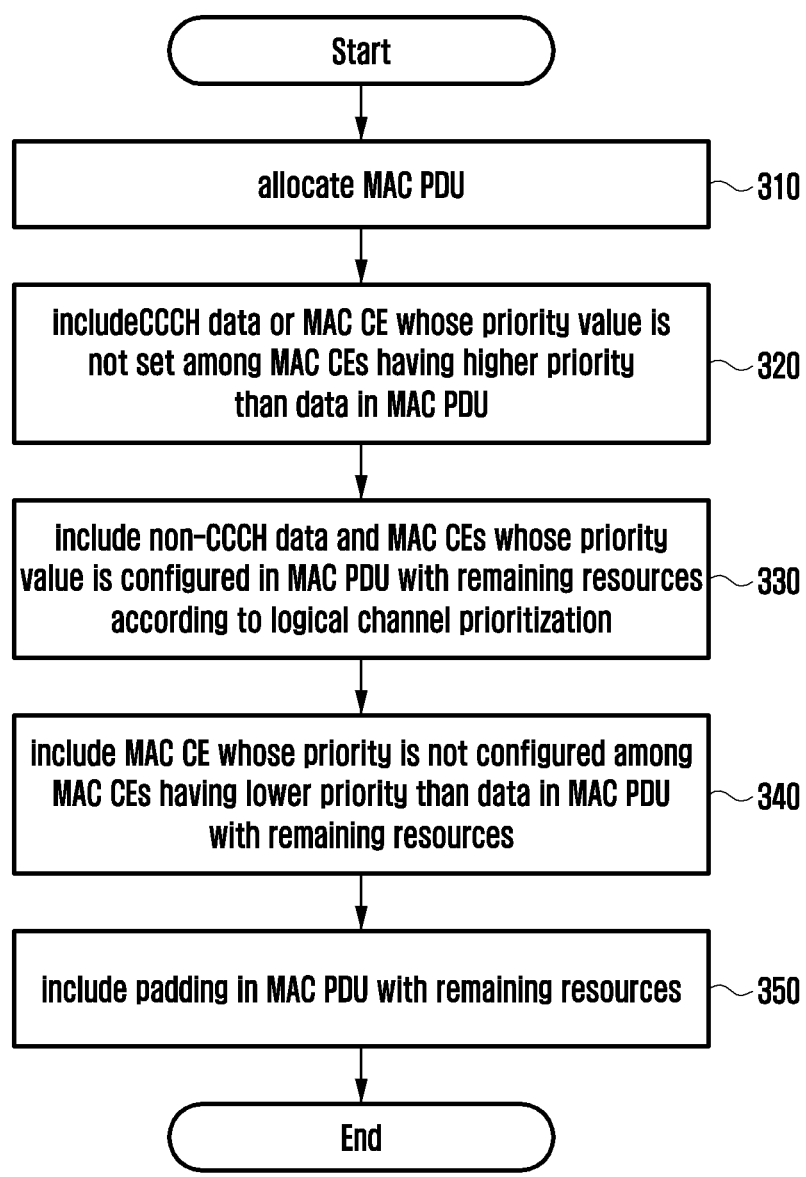
FIG. 3 illustrates a detailed operation process in which the terminal assigns MAC CEs and data to a MAC PDU.

Specifically, MAC CEs and logical channels for data may be processed in the following order of priority.
C-RNTI MAC CE or uplink CCCH data
Configured grant confirmation MAC CE
Non-padding BSR
Single entry PHR or multiple entry PHR
Data of logical channels excluding uplink CCCH
RBR query MAC CE
Padding BSR MAC CE FIG. 3 is a flowchart illustrating detailed operations of the terminal proposed in the disclosure to assign MAC control elements (CEs) and data to a MAC PDU. In the embodiment of FIG. 3, it is assumed that priority values are configured for all or some MAC CEs that can be transmitted by the terminal. In the related art, priority values are assigned only to logical channels corresponding to data, and the priority order of a MAC CE is determined only with data and other MAC CEs. However, the priority of a MAC CE may be higher than some data and lower than some other data. To this end, the terminal may assign priority values to MAC CEs in correspondence to the range of priority values of data to thereby configure a relative priority with data. The priority value of the MAC CE may be assigned by an RRC message, a configuration message of the base station such as a system information block, or a specific rule.

When the terminal is allocated a MAC PDU (310), it may first include, in the MAC PDU, CCCH data or a MAC CE whose priority value is not configured among MAC CEs having a higher priority than non-CCCH data (320). For example, if there is CCCH data, the terminal may determine to include the CCCH data in the MAC PDU first. Or, if there is a MAC CE having a higher priority than non-CCCH data, the terminal may determine to include the MAC CE in the MAC PDU. Here, if the resources allocated for the MAC PDU do not have a size sufficient to include the CCCH data or MAC CE, the CCCH data or MAC CE cannot be included. Also, if there is no CCCH data or MAC CE whose priority value is not configured, the corresponding CCCH data or MAC CE cannot be included. MAC CEs having a higher priority than non-CCCH data may include C-RNTI MAC CE, configured grant confirmation MAC CE, non-padding buffer status report (BSR), single entry power headroom report (PHR), multiple entry PHR, or the like. If the priority of such a MAC CE is not separately configured, it may be included in the MAC PDU at step 320. In a certain embodiment, if the configured priority value of a MAC CE is a value smaller than 1, which is the highest priority value (the smaller priority value takes precedence) configured for non-CCCH data, it may be included first in the MAC PDU at step 320.

If there are unallocated resources remaining after step 320, the terminal may include non-CCCH data and MAC CEs whose priority value is configured in the MAC PDU with remaining resources according to logical channel prioritization (330). The terminal may receive related parameters for logical channel prioritization from the base station through an RRC message when a corresponding logical channel is established. The corresponding parameters may include prioritized bit rate (PBR), bucket size duration (BSD), and priority. By using the above parameters, the terminal may update the Bj value (data to be processed for logical channel j) for each logical channel. The Bj value is used at the first step of logical channel prioritization, and the terminal may allocate resources to logical channels with Bj greater than 0 in order of priority at the first step of logical channel prioritization. Then, the terminal decreases the Bj value by the amount of the allocated resources. If there are still remaining resources after the first step, at the second step of logical channel prioritization, the terminal may allocate resources so that all residual data of a logical channel can be transmitted in the order of priority of the logical channels regardless of Bj.

If there are remaining resources that are not allocated after step 330, a MAC CE whose priority is not configured among MAC CEs having a lower priority than data may be included in the MAC PDU with remaining resources (340). Here, if the allocated resource of the MAC PDU is not large enough to include the corresponding MAC CE, the corresponding MAC CE cannot be included. And, if the corresponding MAC CE does not exist, the corresponding MAC CE cannot be included. MAC CEs having a lower priority than data may include recommended bit rate (RBR) query MAC CE, padding BSR MAC CE, or the like. If the priority of such a MAC CE is not separately configured, it may be included in the MAC PDU at step 340. In a certain embodiment, even when the configured priority value of a MAC CE is greater than 16, which is the lowest priority value (the smaller priority value takes precedence) configured for non-CCCH data, it may be included in the MAC PDU at step 340. When there are unallocated resources remaining after step 340, a padding may be included in the MAC PDU with remaining resources (350).

Specifically, MAC CEs and logical channels for data may be processed in the following order of priority.
C-RNTI MAC CE, or uplink CCCH data
Configured grant confirmation MAC CE whose priority value is not configured
Non-padding BSR whose priority value is not configured
Single entry PHR or multiple entry PHR whose priority value is not configured
Data of logical channels excluding uplink CCCH, and MAC CE whose priority value is configured
RBR query MAC CE whose priority value is not configured
Padding BSR MAC CE Among them, it may be not allowed to configure a priority value for a certain MAC CE. This may be because the corresponding MAC CE may always have a high or low priority. In the embodiment of FIG. 3, some MAC CEs have a priority value and participate in logical channel prioritization together with logical channels for data.

Figure 4:
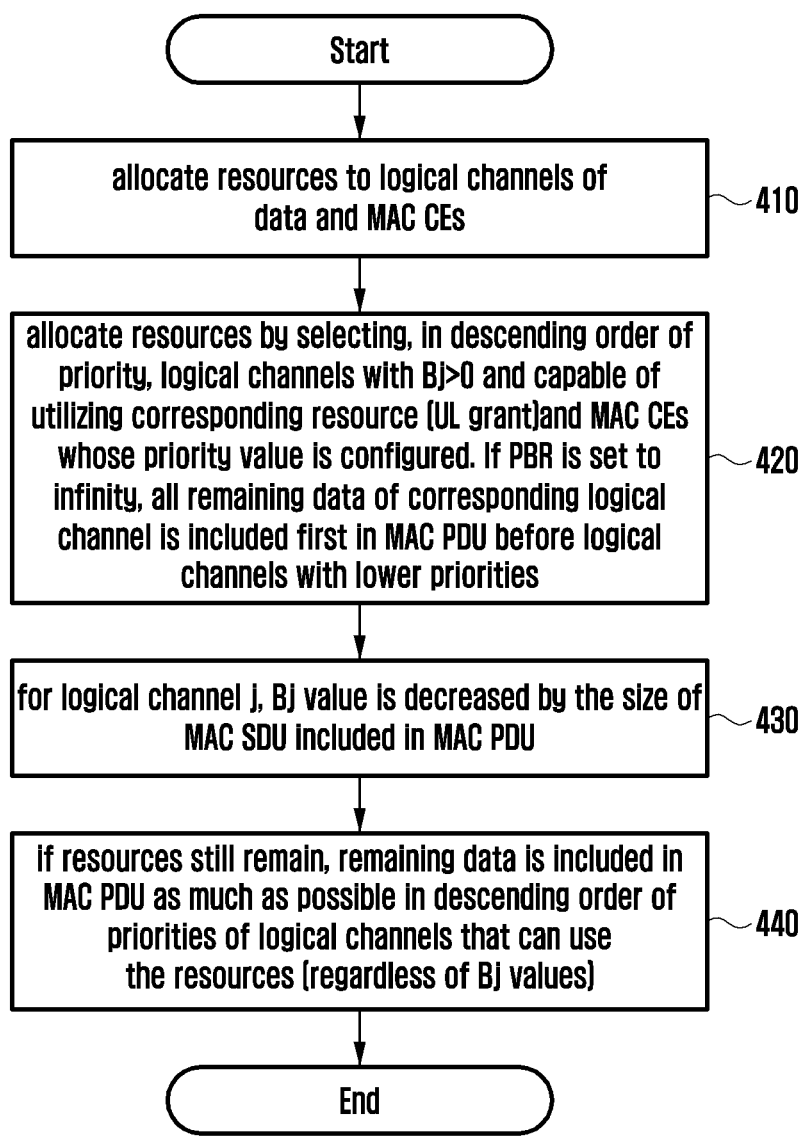
FIG. 4 illustrates operations of a logical channel prioritization process for data of logical channels and MAC CEs.

FIG. 4 illustrates operations of a logical channel prioritization process for data of logical channels and MAC CEs. When the MAC entity of the terminal needs to generate a MAC PDU for new transmission (410), it may follow the process of generating the MAC PDU according to the priority of MAC CEs without a priority value and data described in FIG. 2 or FIG. 3. The embodiment of FIG. 4 describes in detail the operation of including data of logical channels and MAC CEs whose priority value is configured in the MAC PDU described at step 330. To this end, the terminal may utilize the corresponding uplink resource (uplink grant, UL grant), and may allocate resources by selecting, in descending order of priority, logical channels whose state variable Bj is greater than 0 and MAC CEs whose priority value is configured. If there is a logical channel whose PBR is set to infinity, the terminal may include first all remaining data of the logical channel in the MAC PDU before logical channels with lower priorities (420).

If resources are used for logical channel j at step 420, the value of the Bj variable may be decreased by the size of the MAC SDU included in the MAC PDU. For example, if Bj is 300 bytes and a MAC SDU of 305 bytes is allocated for logical channel j, Bj will be −5, which is the value obtained by subtracting 305 from 300 (430). If resources still remain even after that, the remaining data may be included in the MAC PDU as much as possible in descending order of priorities of logical channels that can use the resources. Here, the meaning of including data in the MAC PDU as much as possible means that there is little data remaining in the MAC PDU so that it is impossible to allocate any more resources to the MAC PDU, or there is little data to be sent for the corresponding logical channel. In this case, the logical channel may be selected regardless of whether the Bj value is greater than 0, unlike at step 420 (440). Further, in a certain embodiment, it may be assumed that the PBR is set to infinity when a priority value is configured for a MAC CE.

When a priority value is configured for a MAC CE, the priority value of the MAC CE may be identical to that of a certain logical channel. When allocating MAC PDU resources, it may be necessary to determine which one to be included in the MAC PDU first among the MAC CE and logical channel with the same priority. A possible method for this may be one of the following methods.
Method 1: a MAC CE always takes precedence. Through this, the MAC CE may be transmitted to the base station first.
Method 2: a logical channel of data always takes precedence. Through this, data may be transmitted to the base station.

By using one of the above methods, the base station may predict the operation and state of the terminal, so that radio resource allocation can be performed more smoothly.

Figure 5:
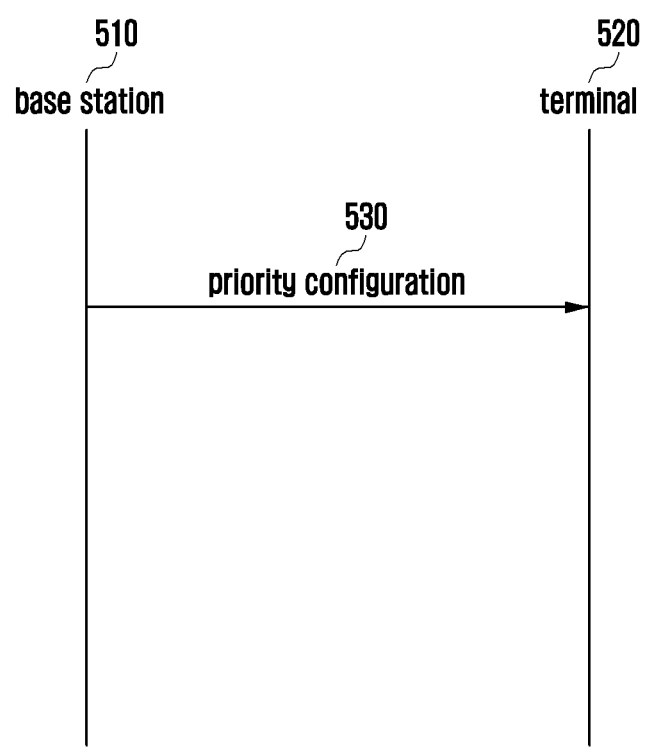
FIG. 5 illustrates a method for the base station to configure priority values of MAC CEs to the terminal.

Meanwhile, FIG. 5 illustrates a method for the base station 510 to configure priority values of MAC CEs to the terminal 520. The base station 510 may configure the priority of each logical channel and MAC CE according to the policy thereof. Then, the base station 510 may allocate radio resources to the terminal based on the settings. To this end, the base station may assign priority values to all or some MAC CEs by sending a priority configuration message to the terminal 520 (530). The priority configuration message may be transmitted by being included in an RRC configuration message or a system information block. Information that can be included in the priority configuration message may be an indicator of a MAC CE, a logical channel ID of a MAC CE, a priority value of each MAC CE, or a logical channel configuration (LogicalChannelConfig) field for logical channels indicated by individual MAC CEs. The base station may represent the priority as a number and configure a numerical priority value for each MAC CE together. For example, as to a MAC CE for a non-padding BSR, the base station may configure information such as "MAC CE for a non-padding BSR having a priority value set to 5" and transmit it to the terminal.

FIG. 6 illustrates a method of configuring a priority value for a MAC CE. The base station may configure the priority of each logical channel and MAC CE according to the policy thereof, and may allocate radio resources to the terminal based on the configured priority. Here, it is necessary to configure which MAC CE has which priority value. Hence, this configuration can be represented in the form of an ordered pair of MAC CE and priority value. In the embodiment of FIG. 6, the priorities of individual MAC CEs are represented in the form of a list called MacCePriorityList IE (information IE). MacCePriorityList has MacCePriority as a lower-level IE, and this MacCePriority may be represented as a list. Further, each MacCePriority IE may have a MacCeType field indicating the type of a MAC CE and a Priority field for a priority. The priority value used here may be a priority value used by a logical channel corresponding to data, or may be a different priority value applied only to a MAC CE. For example, a MAC CE may have a priority of a decimal value ranging from 0.5 to 15.5 in steps of 1. Here, MacCeType may serve as an indicator indicating all or some MAC CEs in order to indicate which MAC CE is configured. And, if the priority of a MAC CE is configured, the PBR value of the corresponding MAC CE may be set to infinity.

FIG. 7 illustrates a method of configuring a priority value for a MAC CE. The base station may configure the priority of each logical channel and MAC CE according to the policy thereof, and may allocate radio resources to the terminal based thereon. Further, logical channel configuration (LogicalChannelConfig) information such as PBR, BSD, and restriction on usable resources may be transmitted together with the priority value. In this case, it may be represented in the form of an ordered pair of MAC CE and logical channel configuration of the MAC CE. In the embodiment of FIG. 7, the priorities of individual MAC CEs are represented in the form of a list called MacCePriorityList IE (information IE). MacCePriorityList has MacCePriority as a lower-level IE, and this MacCePriority may be represented as a list. In addition, each MacCePriority IE may have a MacCeType field indicating the type of MAC CE and a logical channel configuration field. Further, this logical channel configuration field may include a priority value of a corresponding logical channel, for example, a corresponding MAC CE. Here, MacCeType may serve as an indicator indicating all or some MAC CEs in order to indicate which MAC CE is configured.

FIG. 8 illustrates a method of configuring a priority value for a MAC CE. The base station may configure the priority of each logical channel and MAC CE according to the policy thereof, and may allocate radio resources to the terminal based on the configured priority of each logical channel and MAC CE. Further, logical channel configuration (LogicalChannelConfig) information such as PBR, BSD, and restriction on usable resources may be transmitted together with the priority value. Here, the MAC CE and the configured value of the MAC CE may be represented in the form of a sequence. In the embodiment of FIG. 8, the priorities of individual MAC CEs are represented in the form of a list called MacCePriorityList IE (information IE). MacCePriorityList has MacCePriority as a lower-level IE, and this MacCePriority may be represented as a list. In addition, each MacCePriority IE may have fields such as MacCeType indicating the type of MAC CE, priority value, and PRB value. In addition, a configuration value that the MAC CE can have may be configured by being included as an element of the sequence. Here, MacCeType may serve as an indicator indicating all or some MAC CEs in order to indicate which MAC CE is configured.

Figure 9:
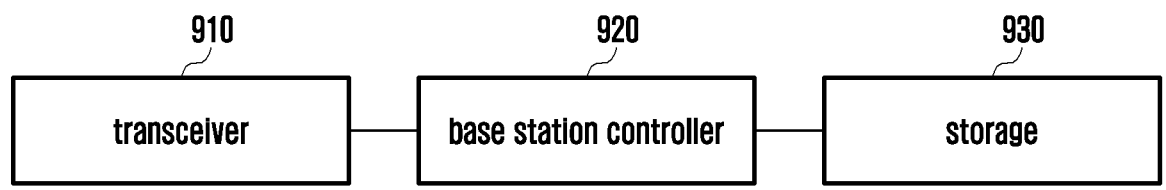
FIG. 9 is a diagram illustrating the structure of a base station according to an embodiment of the disclosure.

FIG. 9 is a diagram illustrating the structure of a base station according to an embodiment of the disclosure.

With reference to FIG. 9, the base station may include a transceiver 910, a controller 920, and a storage 930. In the disclosure, the controller 920 may be defined as a circuit, an application-specific integrated circuit, or at least one processor.

The transceiver 910 may transmit and receive signals to and from other network entities. The transceiver 910 may transmit, for example, system information to a terminal, and may transmit a synchronization signal or a reference signal.

The controller 920 may control the overall operation of the base station according to the embodiment proposed in the disclosure. The controller 920 may control a signal flow between blocks to perform operations according to the above-described flowchart. For example, the controller 920 may configure a priority value for a MAC CE to the terminal according to the method described above.

The storage 930 may store at least one of information transmitted and received through the transceiver 910 or information generated through the controller 920.

Figure 10:
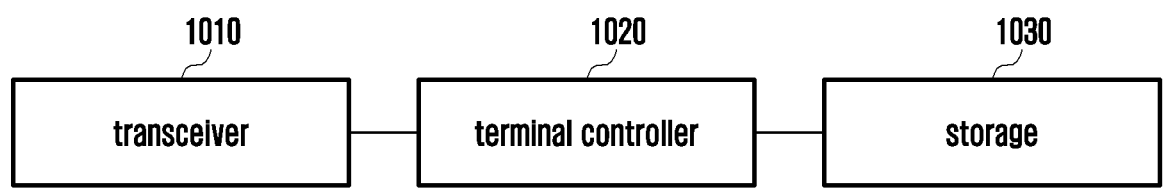
FIG. 10 is a diagram illustrating the structure of a terminal according to an embodiment of the disclosure.

FIG. 10 is a diagram illustrating the structure of a terminal according to an embodiment of the disclosure.

With reference to FIG. 10, the terminal may include a transceiver 1010, a controller 1020, and a storage 1030. In the disclosure, the controller may be defined as a circuit, an application-specific integrated circuit, or at least one processor.

The transceiver 1010 may transmit and receive signals to and from other network entities. The transceiver 1010 may receive, for example, system information from a base station, and may receive a synchronization signal or a reference signal.

The controller 1020 may control the overall operation of the terminal according to the embodiment proposed in the disclosure. For example, the controller 1020 may control a signal flow between blocks to perform operations according to the above-described flowchart.

Specifically, the controller 1020 may identify whether, among at least one medium access control (MAC) control element (CE), there is a MAC CE having a higher priority than data, determine, if there is a MAC CE having a higher priority than data, to include the MAC CE having a higher priority than data in a MAC protocol data unit (PDU), and generate the MAC PDU based on the determination.

The storage 1030 may store at least one of information transmitted and received through the transceiver 1010 or information generated through the controller 1020.

In consideration of the priority of a MAC CE, the relative priorities of the MAC CE and data are configured by the terminal and the base station as described above, so that the MAC PDU can be transmitted according to the priority.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium are configured to be executable by one or more processors of an electronic device. The one or more programs include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EE-PROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide LAN (WLAN), or a storage area network (SAN), or a communication network composed of a combination of these. Such a storage device may access the device that carries out an embodiment of the disclosure through an external port. Further, a separate storage device on a communication network may access the device that carries out an embodiment of the disclosure.

In the specific embodiments of the disclosure, the elements included in the disclosure are expressed in a singular or plural form according to the proposed specific embodiment. However, the singular or plural expression is appropriately selected for ease of description according to the presented situation, and the disclosure is not limited by a single element or plural elements. Those elements described in a plural form may be configured as a single element, and those elements described in a singular form may be configured as plural elements.

While the disclosure has been shown and described with reference to various embodiments thereof, it should be understood by those skilled in the art that many variations and modifications of the basic inventive concept described herein will still fall within the spirit and scope of the disclosure as defined in the appended claims and their equivalents.

The invention claimed is:

1. A control method of a terminal in a wireless communication system, the method comprising:
   identifying whether a first medium access control (MAC) control element (CE) is pre-determined to have a higher priority than data;
   identifying whether a priority value is configured to the first MAC CE, in case that the first MAC CE is pre-determined to have the higher priority than the data;
   determining to include the first MAC CE in an MAC protocol data unit (PDU), in case that the priority value is not configured to the first MAC CE;
   identifying whether a second MAC CE is pre-determined to have the higher priority than the data;
   identifying whether the second MAC CE has a higher priority value than the data, in case that the second MAC CE is not pre-determined to have the higher priority than the data;
   determining to include the second MAC CE having the higher priority value than the data in the MAC PDU; and
   generating the MAC PDU.

2. The control method of claim 1, wherein the data is from a logical channel except for a common control channel (CCCH).

3. The control method of claim 1, further comprising receiving priority information configured for each of at least one MAC CE from a base station.

4. The control method of claim 3, wherein the priority information includes MAC CE type information and a priority value for each of the at least one MAC CE.

5. The control method of claim 1, further comprising:
   identifying whether a third MAC CE is pre-determined to have the higher priority than the data;
   identifying whether the third MAC CE has a higher priority value than the data, in case that the third MAC CE is not pre-determined to have the higher priority than the data;
   identifying whether remaining resources exist among resources allocated to the MAC PDU, in case that the second MAC CE having the higher priority value than the data is included in the MAC PDU and the third MAC CE is identified to have a lower priority value than the data; and
   determining to include the third MAC CE in the MAC PDU in case that remaining resources exist.

6. The control method of claim 1, wherein identifying whether the second MAC CE is pre-determined to have the higher priority than the data comprises:
   identifying whether remaining resources exist among resources allocated to the MAC PDU after the first MAC CE is determined to be included in the MAC PDU; and
   identifying whether the second MAC CE is pre-determined to have the higher priority than the data, in case that remaining resources exist.

7. The control method of claim 1, wherein the first MAC CE which is pre-determined to have the higher priority than the data comprises at least one of a cell-radio network temporary identifier (C-RNTI) MAC CE, a configured grant confirmation MAC CE, a non-padding buffer status report (BSR), a single entry power headroom report (PHR) or a multiple entry PHR.

8. A terminal in a wireless communication system, comprising:
   a transceiver; and
   a controller that is configured to:
      identify whether a first medium access control (MAC) control element (CE), is pre-determined to have a higher priority than data,
      identify whether a priority value is configured to the first MAC CE, in case that the first MAC CE is pre-determined to have the higher priority than the data,
      determine to include the first MAC CE in an MAC protocol data unit (PDU), in case that the priority value is not configured to the first MAC CE;
      identify whether a second MAC CE is pre-determined to have the higher priority than the data, identify whether the second MAC CE has a higher priority value than the data, in case that the second MAC CE is not pre-determined to have the higher priority than the data, determine to include the second MAC CE having the higher priority value than the data in the MAC PDU, and control to generate the MAC PDU.

9. The terminal of claim 8, wherein the data is from a logical channel except for a common control channel (CCCH).

10. The terminal of claim 8, wherein the controller is further configured to control the transceiver to receive priority information configured for each of at least one MAC CE from a base station.

11. The terminal of claim 10, wherein the priority information includes MAC CE type information and a priority value for each of the at least one MAC CE.

12. The terminal of claim 8, wherein the controller is further configured to:

identify whether a third MAC CE is pre-determined to have the higher priority than the data, identify whether the third MAC CE has a higher priority value than the data, in case that the third MAC CE is not pre-determined to have the higher priority than the data, identify whether remaining resources exist among resources allocated to the MAC PDU, in case that the second MAC CE having the higher priority value than the data is included in the MAC PDU and the third MAC CE is identified to have a lower priority value than the data, and determine to include the third MAC CE in the MAC PDU in case that remaining resources exist.

13. The terminal of claim 8, wherein the controller is further configured to:

identify whether remaining resources exist among resources allocated to the MAC PDU after the first MAC CE is determined to be included in the MAC PDU, and identify whether the second MAC CE is pre-determined to have the higher priority than the data, in case that remaining resources exist.

14. The terminal of claim 8, wherein the first MAC CE which is pre-determined to have the higher priority than the data comprises at least one of a cell-radio network temporary identifier (C-RNTI) MAC CE, a configured grant confirmation MAC CE, a non-padding buffer status report (BSR), a single entry power headroom report (PHR) or a multiple entry PHR.

* * * * *